Sheet II

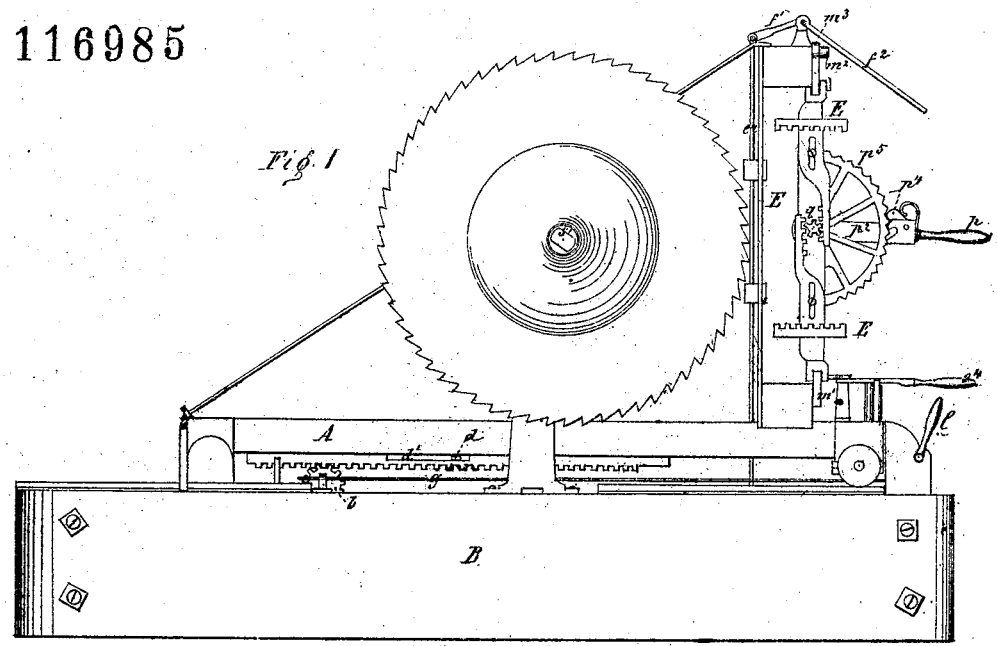
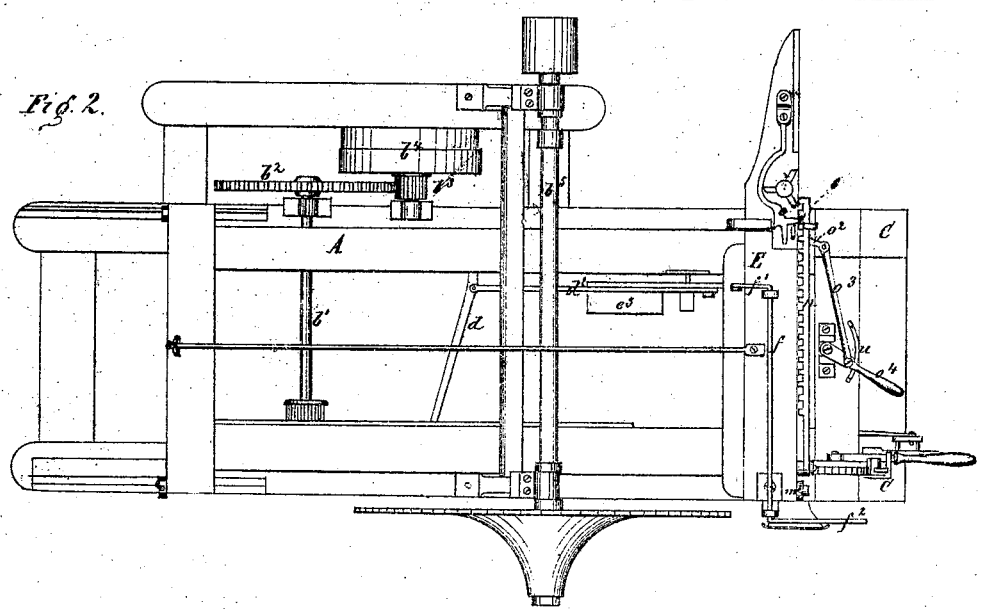

*Franklin Muzzy.*

*Shingle-Machine.*

Witnesses:

Inventor:
Franklin Muzzy
PER
Attorneys.

116,985

UNITED STATES PATENT OFFICE.

FRANKLIN MUZZY, OF BANGOR, MAINE.

IMPROVEMENT IN SHINGLE-MACHINES.

Specification forming part of Letters Patent No. 116,985, dated July 11, 1871.

*To all whom it may concern:*

Be it known that I, FRANKLIN MUZZY, of Bangor, in the county of Penobscot and State of Maine, have invented a new and Improved Shingle-Machine; and I do hereby declare the following to be a full, clear, and exact description of the same, reference being had to the accompanying drawing making a part of this specification, in which—

Figure 3:
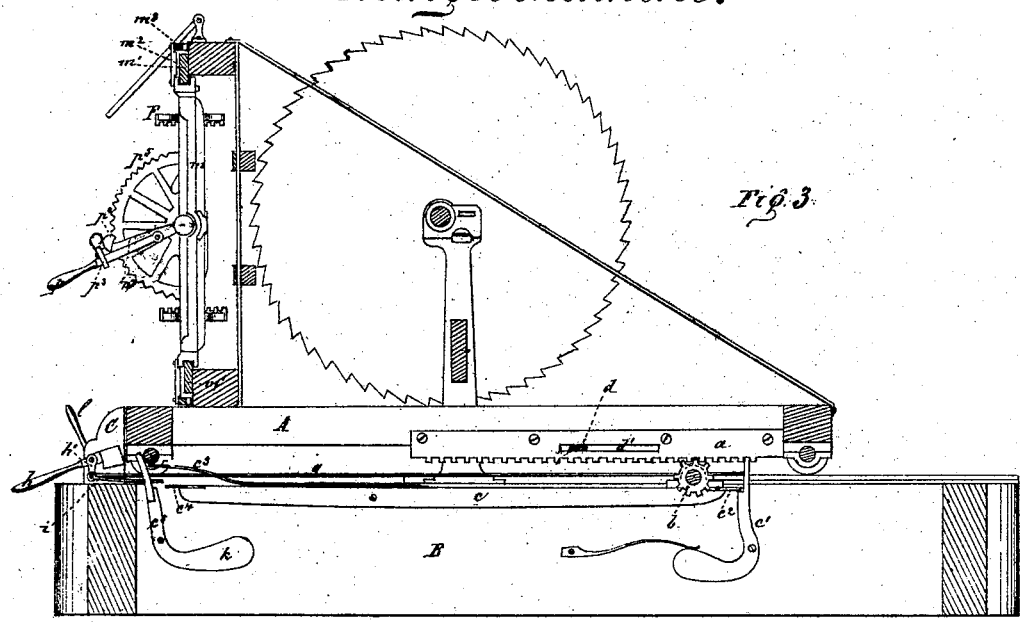
Figure 4:
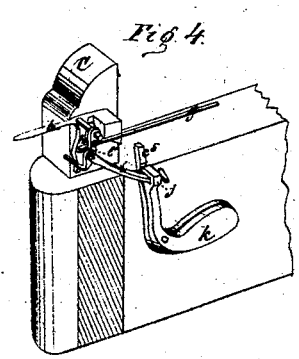
Figure 5:
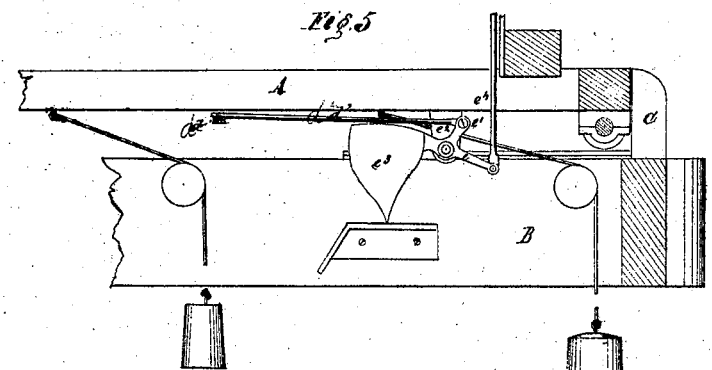
Figure 6:
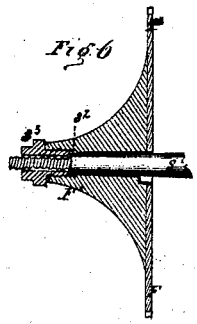
Figure 7:
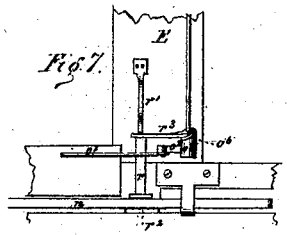
Figure 8:
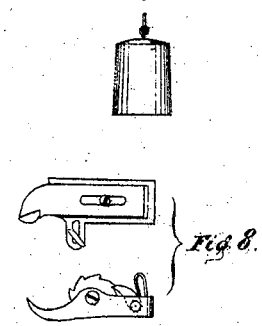

Figure 1 is a side elevation. Fig. 2 is a top view. Fig. 3 is a sectional elevation. Fig. 4 is a detached perspective of the apparatus for stopping the carriage. Fig. 5 is a detached side elevation of the apparatus for keeping the lever $f^2$ in connection with the shingle-block. Fig. 6 is a sectional elevation of the saw and the nut for effecting its removal from the shaft. Fig. 7 is a detached side elevation of the friction device for keeping the lower rack in place, and Fig. 8 includes a view of the set-lever and also of the slotted plate and pins that operate the set-lever.

This invention relates principally to an apparatus whereby the reciprocating carriage, which carries the shingle-block forward against the saw and backward from it, is made to work automatically by throwing the pinion that drives the carriage out of gear therewith at the moment the shingle is severed from the block, and thus subjecting the carriage to the action of the weight, which draws it back, and by throwing the aforesaid pinion into gear with the carriage at the moment the latter reaches the end of its backward movement, and thus causing the carriage to move forward again. The invention also relates to an apparatus whereby the aforesaid pinion can be thrown out of gear with the carriage at any time and by the same movement, so disposed that it cannot be automatically thrown into gear again, the object of this arrangement being to stop the forward movement of the carriage at any desired point and to prevent the carriage from starting forward when at the end of its backward movement. The invention also relates to a device whereby the saw can be easily removed from its shaft for filing or other repair, so as to obviate the necessity of filing the saw on the machine, which can only be done by stopping the latter during the time of filing or repairing. The invention also relates to sundry other improvements, which, together with those above indicated, are hereinafter fully described.

Referring to the drawing, A is the reciprocating carriage, to the under side of which is secured a rack, $a$. The carriage is driven forward by the rotating pinion $b$ when thrown into gear with the rack $a$. The mechanism by which the pinion $b$ is rotated is lettered $b^1$ $b^2$ $b^3$ $b^4$ $b^5$, and requires no particular description. The shaft $b^1$ is supported at its pinion end in a box secured to a lever, $c$, pivoted to the inner side of the adjacent track-timber B, Fig. 3. The pinion $b$ is held in gear with the rack $a$ by a spring-latch, $c^1$, Fig. 3, slipping under a projection, $c^2$, on the end of the lever $c$. The pinion $b$ is thrown out of gear with the rack $a$ by pushing back the latch $c^1$, thus allowing the longer arm of the lever $c$ to fall by its own weight and that of the pinion $b$. While the machine is in operation the latch $c$ is thus pushed back automatically by a finger, $d$, jointed at one end to the under side of the carriage, and extending through a slot, $d^1$, Fig. 3, in the rack $a$, far enough to stride the latch $c^1$ as the carriage runs forward. On the striking of the latch $c^1$ by the finger $d$, the latch is pushed back, and the pinion $b$ falls from the rack $a$ just far enough to disengage it. The carriage is thereupon immediately drawn back against the stops C, Figs. 1, 2, 3, 4, by the action of the weight D, Fig. 5. It is important that the carriage should cease advancing the moment the saw has cut through the shingle-bolt, whatever the thickness of the latter. To this end a rod, $d^2$, Figs. 2, 5, connects the finger $d$ with an arm, $e^1$, that extends upward from a lever, $e$, pivoted to a horizontal plate, $e^2$, attached to and projecting beneath the carriage A. A counter-weight, $e^3$, is attached to one end of the lever $e$, and to its other end is jointed a vertical rod, $e^4$, Fig. 5, whose upper extremity is pivoted to the end of an arm, $f^1$, that extends from a horizontal rod, $f$, mounted on the top of the frame E' that travels with the carriage A. A longer arm, $f^2$, also extends from the rod $f$ over the dogs E that hold the shingle-bolt. The office of the counter-weight $e^3$ is to draw the arm $f^2$ against the shingle-bolt, and, at the same time, by means of the rod $d^2$, to set the finger $d$ in its proper relation to the latch $c^1$, so that, in the progress of the carriage, said finger shall strike the latch just as the saw cuts off the shingle. The wider the shingle-bolt the farther should the finger be set from the latch. The nearer the arm $f^2$ is turned toward the horizontal the greater is the distance between the finger and latch. The wider the shingle-bolt the nearer is the arm $f^2$ turned toward the horizontal. Therefore, whatever may be the width of shingle-bolt, the finger $d$ always strikes the latch $c^1$, and, consequently, stops the carriage the moment the saw cuts off the shingle. To the upper side of the shorter arm of the lever $c$ a spring, $c^3$, is attached, which the carriage, as it moves backward, depresses. A projection, $c^4$, on the end of the lever $c$, resting on the latch $c^5$—that is, hung to the track-timber B—holds the lever in place against the force of the spring $c^3$, allowing the latter, however, to still descend and gather force by compression. Finally, the end of the carriage strikes the latch $c^5$, disengaging it from the end of the lever, and subjecting it to the pressure of the spring just as the carriage reaches the stops C, whereupon the spring $c^3$ immediately depresses the shorter arm of the lever $c$ until the pinion $b$ is once more thrown by elevation into gear with the rack $a$ and the latch $c^1$ slips under the other end of the lever. As the shaft $b^1$ is constantly rotating, the carriage thereupon at once begins to move forward again, and continues to move forward till the finger $d$ once more pushes the latch $c^1$ away from the lever. When this occurs the carriage moves back, as above explained, and thus continues to reciprocate automatically as long as required. The carriage may be stopped at any point of its forward movement by pushing back the latch $c^1$ by means of a rod, $g$, Figs. 1, 3, 4, which is supported on the track-timber B, and has at its end a finger that projects in front of the latch $c^1$. At its other end the rod $g$ is jointed to an arm, $h'$, extending downward from a lever, $h$, that is pivoted to one of the stops C. The latch $c^1$ is pushed back by means of the rod $g$, worked by the lever $h$, the effect of which pushing is the immediate return of the carriage to the stops C, whether the saw has cut through the bolt or not. To interrupt the automatic operation of the carriage and bring it to a complete stand, a tongue, $i$, Figs. 3, 4, is thrust under the projection $c^4$ of the lever $c$ prior to the depression of the shorter arm of said lever by the returning carriage. The tongue $i$ runs through an eye, $j$, in an elbow-lever, $k$, Fig. 4, pivoted to the track-timber by the side of the latch $c^5$. The tongue $i$, when thus thrust under the lever $c$, prevents the shorter arm of the latter from being thrown downward by the returning carriage, and consequently prevents the pinion $b$ from being thrown into gear with the rack $a$. Therefore, when the carriage reaches the stop C the mechanism that ordinarily moves it forward is inoperative and the carriage stands still. It is set in motion again by withdrawing the tongue $i$ from beneath the lever $c$. The tongue $i$ is jointed to an arm, $l'$, extending from a shaft that runs transversely through one of the stops C, and is provided with a handle, $l$, for rotating the shaft and operating the tongue. The dogs E slide on a vertical standard, $m$, Fig. 3, which is grooved at its upper and lower ends so as to move on the horizontal ways $m^1$. The standard is provided with an arm, $m^2$, which extends above the upper edge of the upper guide-bar $m^1$. A roller, $m^3$, pivoted to the upper end of the arm $m^2$, rests on the guide-bar. A similar roller may be attached to the lower end of the standard $m$ so as to rest on the lower guide-bar. This arrangement enables the dogs E and racks $n$ to slide easily in a vertical position instead of lying horizontal, as they do in ordinary machines. The cam-shaft $o$, Fig. 7, whose finger $c^5$, Fig. 2, throws back the upper dog $o^1$, is provided with an arm, $o^2$, which is connected by a pitman, $o^3$, Fig. 2, with a lever, $o^4$, which is within convenient reach of the operator when standing in his proper position by the shingle-bolt, thus rendering it unnecessary for the operator, in order to move the racks for the purpose of putting in or changing the position of a bolt, $n$, to leave his position and pass in front of the racks, as he is compelled to do unless the pitman and lever are employed. The lever $p$, Figs. 1, 3, by which the dogs E are operated, is pivoted to the side of an arm, $p^2$, that is jointed at its inner end to the center of the standard $m$. At the outer end of the arm $p^2$ is a loop, $p^3$, through which the lever $p$ passes. A pawl $p^4$ is pivoted to the outer end of the arm $p^2$, which pawl is pressed by a spring against the semicircular ratchet $p^5$. A projection from the pawl $p^4$ extends over the lever $p$. When the latter is raised the first effect is to lift the pawl $p^4$ far enough to disengage it from the ratchet $p^5$. Then the lever $p$, striking the upper part of the loop $p^3$, lifts the arm $p^2$, rotates the pinion $q$, Fig. 1, to which the arm $p^2$ is attached, and, consequently, raises the upper dog and depresses the the lower one. On lowering the bar $p$ the pawl $p^4$ acts against the ratchet $p^5$, and, consequently, prevents the dogs E from moving otherwise than as they are moved by the arm $p^2$. The peculiarity of this arrangement is that the pawl $p^4$, while holding all that the lever $p$ gains during its descent, presents no obstacle to lifting said lever, and thus rendering the use of a pawl possible, effects a great saving in the time that is required to operate the lever. The lower rack $n$, Fig. 7, is apt to slide forward under the gravitating action of a heavy shingle-bolt. To obviate this a bar, $r$, Fig. 7, inclosed in a suitable support on the front side and lower rail of the frame E', is pressed upon the rack $n$ by a spring, $r^1$, attached to the frame above the said bar. A piece of wood, $r^2$, is placed under the rack $n$ beneath the bar $r$, the object of the arrangement being to generate so much friction during the movement of the rack $n$ as to prevent its sliding forward. An arm, $r^3$, extends from the bar $r$ to the inclined top of the collar $o^6$, which secures the arm $o^2$ to the shaft $o$. Therefore, when the shaft $o$ is turned for the purpose of disengaging the dog from the lower rack $n$, the collar $o^6$ lifts the bar $r$ from said rack, thus leaving it free to move. The spring $r^1$ restores the pressure of the bar to the rack as soon as the shaft $o$ returns to its original position. The joint between the saw F and its shaft $s$, Fig. 6, requires to be a very closely-fitting one, so that it is not easy, by hammering, to remove the saw from the shaft without injuring the former. But it is desirable that the saw should be easily removed in order that it may be taken off as often as it requires filing or other repair, and its place supplid by another. The saw is secured upon the shaft by means of a nut, $s^1$, screwed on the end of the latter outside the saw. My saw-collar is made with a tapped hole concentric with the shaft, which hole extends inward to a shoulder, $s^2$, on the shaft. To remove the saw the nut $s^1$ must be unscrewed, and a drawing-nut, $s^3$, Fig. 6, screwed into the aforesaid hole in the collar. When the end of this nut strikes the shoulder $s^2$ of the shaft the nut draws the saw endwise along the shaft, loosening it so that it can be readily removed.

Having thus described my invention, what I claim as new, and desire to secure by Letters Patent, is—

1. The combination of the latch $c^1$, bar $g$, and lever $h$, as described.

2. The combination of the lever $c$, tongue $i$, lever $k$, and levers $l\ l'$, as set forth.

3. The combination of the carriage A, finger $d$, connecting-bars $d^2\ e^4$, lever $e$, counter-weight $e^3$, rod $f$, and arms $f^1 f^2$, as explained.

4. The combination of the shaft $o$, arm $o^2$, pitman $o^3$, handle $o^4$, and stand $u$, as described.

5. The combination of the lever $p$, arm $p^2$, pawl $p^4$, and ratchet $p^5$, as described.

6. The combination of the saw-collar $F'$, shaft $s$, and drawing-nut $s^3$, as set forth.

To the above specification of my invention I have signed my hand this 25th day of May, A.D. 1871.

FRANKLIN MUZZY.

Witnesses:
THOS. D. D. OURAND,
CHAS. A. PETTIT.